United States Patent [19]

Ohnishi et al.

[11] Patent Number: 5,013,958
[45] Date of Patent: May 7, 1991

[54] X-Y STAGE WITH ULTRASONIC ACTUATOR

[75] Inventors: Kazumasa Ohnishi; Koichi Naito; Toru Nakazawa, all of Nagaoka, Japan

[73] Assignee: Alps Electric Co., Ltd., Tokyo, Japan

[21] Appl. No.: 423,480

[22] Filed: Oct. 17, 1989

[30] Foreign Application Priority Data

Oct. 18, 1988 [JP]  Japan .................................. 63-262009

[51] Int. Cl.$^5$ ............................................. H01L 41/08
[52] U.S. Cl. ...................................... 310/323; 310/328
[58] Field of Search ........................ 310/328, 321, 323

[56] References Cited

U.S. PATENT DOCUMENTS

| | | | |
|---|---|---|---|
| 4,613,782 | 9/1986 | Mori et al. | 310/328 |
| 4,742,260 | 5/1988 | Shimizu et al. | 310/323 |
| 4,784,323 | 11/1988 | Miller | 310/323 |
| 4,857,791 | 8/1989 | Uchino et al. | 310/328 X |

FOREIGN PATENT DOCUMENTS

| | | | |
|---|---|---|---|
| 0231461 | 12/1985 | Fed. Rep. of Germany | 310/323 |
| 62-4538 | 1/1987 | Japan . | |
| 0081984 | 4/1987 | Japan | 310/323 |
| 0773714 | 10/1980 | U.S.S.R. | 310/323 |
| 0773715 | 10/1980 | U.S.S.R. | 310/323 |

Primary Examiner—Mark O. Budd
Attorney, Agent, or Firm—Guy W. Shoup; Paul J. Winters

[57] ABSTRACT

An X-Y stage including a fixed plate, a moving plate adapted to linearly reciprocatively move relative to the fixed plate, and an ultrasonic linear motor provided on either the fixed plate or the moving plate. The ultrasonic linear motor is provided with at lest two leg portions oriented in a direction perpendicular to a moving direction of the moving plate, a body portion for connecting base ends of the leg portions, and vibration sources for vibrating the leg portions and the body portion. The leg portions have free ends pressed against the other of the fixed plate on which the motor is not provided and the moving plate.

2 Claims, 3 Drawing Sheets

X-Y STAGE WITH ULTRASONIC ACTUATOR

BACKGROUND OF THE INVENTION

The present invention relates to an X-Y stage to be used as index table for an electronic equipment or a precision instrument, and more particularly to an X-Y stage having improved driving means.

A conventional X-Y stage is shown in FIGS. 6 to 8. Referring to FIGS. 6 to 8, an X stage 2 is provided over a fixed plate 1 in such a manner as to be linearly reciprocatively movable through ball bearings B in a horizontal direction, and a Y stage 3 is provided over the X stage 2 in such a manner as to be linearly reciprocatively movable through ball bearings C in a horizontal direction perpendicular to the moving direction of the X stage 2.

A stepping motor 4 is fixed to the fixed plate 1 in such a manner as to project sideward from the X stage 2, and a screw shaft 5 is rotatively driven by the stepping motor 4. The screw shaft 5 is threadedly engaged with a nut (not shown) provided in the X stage 2. Thus, the X stage 2 is reciprocable by driving the stepping motor 4.

Similarly, a stepping motor 6 is fixed to the X stage 2 in such a manner as to project sideward from the Y stage 3, and a screw shaft 7 is rotatively driven by the stepping motor 6. The screw shaft 7 is threadedly engaged with a nut (not shown) provided in the Y stage 3. Thus, the Y stage 3 is reciprocable by driving the stepping motor 6.

In the conventional X-Y stage as mentioned above, the rotary motion of the stepping motor 4 as a driving source is converted into the linear motion through the screw shaft 5 and the nut engaging the same, so as to linearly move the X stage 2, for example. Accordingly, a positioning accuracy of the X stage 2 is limited by backlash of the screw shaft 5 and accumulated error. Further, the X stage 2 cannot be moved at a high speed.

Furthermore, as the stepping motor 4 is so located as to project sideward from the X stage 2, the X-Y stage is enlarged in size.

Additionally, it is very hard to machine a long screw shaft 5 with a high degree of straightness. Accordingly, a moving distance of the X stage 2 is limited.

The above-mentioned problems similarly occur in the Y stage 3.

The present applicant invented a high efficient ultrasonic linear motor utilizing a resonance condition of components (Japanese patent application No. 1-55572). The ultrasonic linear motor is constructed of a traveling member (vibrating member) including at least a pair of leg portions adapted to be vibrated in a direction perpendicular to a rail and a body portion connecting the leg portions and adapted to be vibrated in a direction parallel to the rail. The leg portions and the body portion are vibrated by applying voltages having suitably different phases, so that the motor may on the rail.

SUMMARY OF THE INVENTION

It is a first object of the present invention to provide an X-Y stage having an ultrasonic linear motor which may move the moving plate at a high speed and position the same with a high accuracy.

It is a second object of the present invention to provide an X-Y stage having an ultrasonic linear motor which eliminates a transmitting mechanism such as a screw shaft to thereby make the X-Y stage compact.

It is a third object of the present invention to provide an X-Y stage having an ultrasonic linear motor which may increase a moving distance of the moving plate.

It is a fourth object of the present invention to provide an X-Y stage having an ultrasonic linear motor which may be applied to equipment where a magnetic field must be considered.

According to the present invention, there is provided an X-Y stage comprising a fixed plate, a moving plate adapted to linearly reciprocatively move relative to said fixed plate, and an ultrasonic linear motor provided on said fixed plate or said moving plate, said ultrasonic linear motor being provided with at least two leg portions oriented in a direction perpendicular to a moving direction of said moving plate, a body portion for connecting base ends of said leg portions, and vibration sources for vibrating said leg portions and said body portion, said leg portions having free ends pressed against the other of said fixed plate and said moving plate.

In the X-Y stage as mentioned above, when voltages having suitably different phases are applied to the vibration sources for vibrating the leg portions and the body portion of the ultrasonic linear motor, the leg portions and the body portion are vibrated to cause elliptical vibration of the free ends of the leg portions.

In the case that the ultrasonic linear motor is provided on the fixed plate, the free ends of the leg portions of the motor are alternately pressed against the moving plate in one direction. As a result, the moving plate is linearly moved in one direction relative to the fixed plate.

In the case that the ultrasonic linear motor is provided on the moving plate, the free ends of the leg portions of the motor are alternately pressed against the fixed plate in one direction. As a result, the moving plate is linearly moved together with the motor in a direction counter to the first direction by a reaction of the pressing force applied to the fixed plate.

Other objects and features of the invention will be more fully understood from the following detailed description and appended claims when taken with the accompanying drawings.

DETAILED DESCRIPTION OF THE PREFERRED EMBODIMENTS

Figure 1:
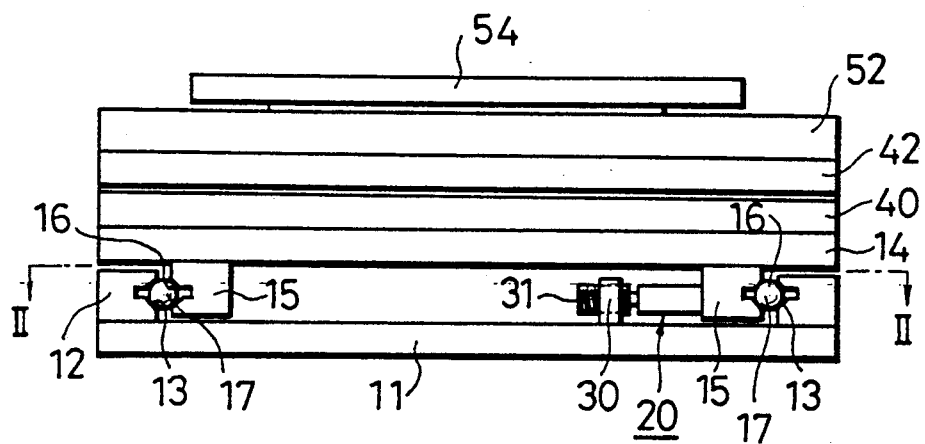
FIG. 1 is an elevational view of the X-Y stage of a preferred embodiment according to the present invention.
Figure 2:
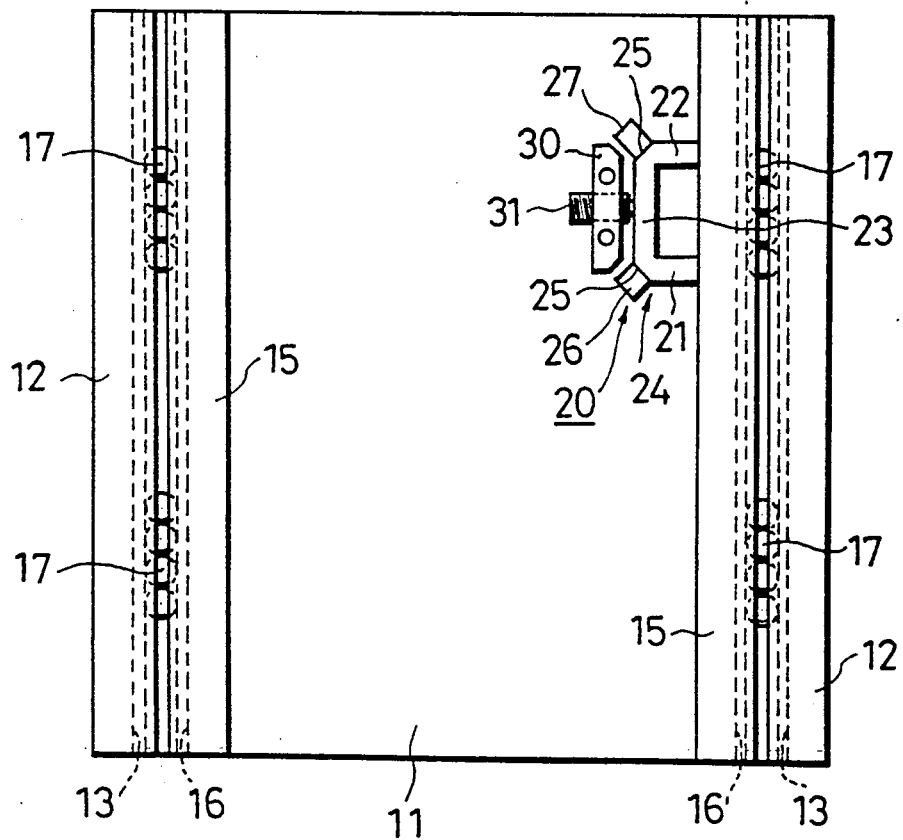
FIG. 2 is a cross section taken along the line II—II in FIG. 1.
Figure 3:
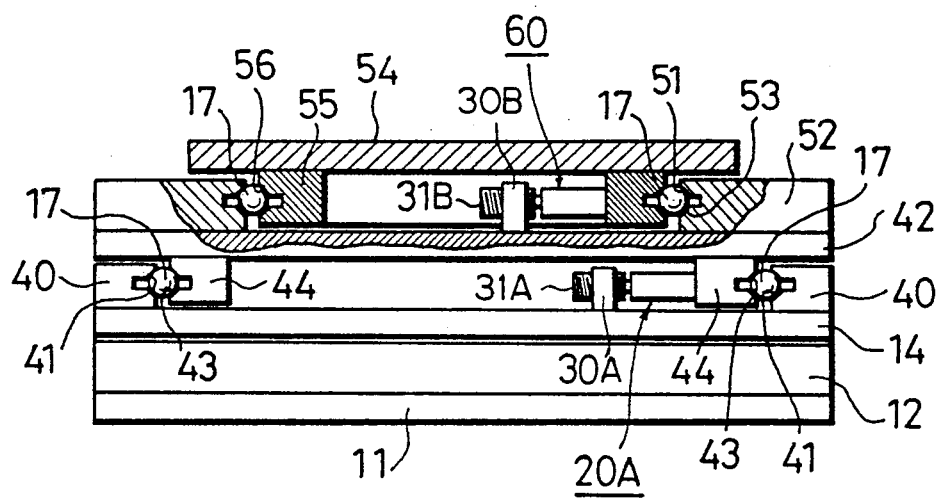
FIG. 3 is a partially sectional side view of FIG. 1.

There will now be described a preferred embodiment of the X-Y stage according to the present invention with reference to FIG. 1 to 4.

Reference numeral 11 designates a rectangular fixed plate. A pair of quadrangular prismatic rail members 12 are fixed at opposite ends on the upper surface of the fixed plate in parallel relationship to each other. Each of the rail members 12 is formed on its inside surface with a straight groove 13 having a substantially V-shaped configuration in cross section. A rectangular X stage (a moving plate) 14 is provided over the fixed plate 11 in the following manner. That is, a pair of quadrangular prismatic rail members 15 are fixed on the lower surface of the X stage 14 at positions just inside of the rail members 12 of the fixed plate 11 in such a manner as to extend along the rail members 12. Each of the rail members 15 is formed on its outside surface (opposed to the inside surface of the mating rail member 12) with a straight groove 16 having a substantially V-shaped configuration in cross section. A plurality of ball bearings 17 are interposed between each groove 16 and the mating groove 13 of each rail member 12. Thus, the X stage 14 is reciprocatively movable along the rail members 12 of the fixed plate 11 through the ball bearings 17.

Reference numeral 20 designates an ultrasonic linear motor comprised of a vibrating member 24 and a pair of piezoelectric elements 26 and 27 as a source of vibration for applying vibration to the vibrating member 24. The vibrating member 24 is constructed of a pair of parallel leg portions 21 and 22 and a body portion 23 connecting base ends of the leg portions 21 and 22 in such a manner as to form a generally U-shaped configuration in plan. The leg portions 21 and 22 and the body portion 23 have a substantially square cross section. A pair of corners of the U-shaped vibrating member 24 are chamfered at an angle of 45 degrees with respect to the leg portions 21 and 22 and the body portion 23, thereby forming a pair of mount surfaces 25 for mounting the pair of piezoelectric elements 26 and 27 through adhesive or the like. The piezoelectric elements 26 and 27 are expanded and contracted in a direction perpendicular to the respective mount surfaces 25 when voltage is applied to the piezoelectric elements 26 and 27. The vibrating member 24 is formed of an elastic material, e.g., a metal material such as aluminum, duralumin, iron, brass or stainless steel; an inorganic material such as alumina, glass or silicon carbide; or an organic material such as polyimide resin or nylon. The piezoelectric elements 26 and 27 are formed by a stacked piezoelectric actuator or a single plate piezoelectric ceramic.

A mounting member 30 for mounting the ultrasonic linear motor 20 is fixed on the fixed plate 11. That is, a spring plunger 31 is threadedly engaged with the mounting member 30, and one end of the spring plunger 31 is attached to the body portion 23 at its central position in such a manner as to bias the body portion 23 toward one of the rail members 15 of the X stage 14 and thereby press the free ends of the leg portions 21 and 22 against the inside surface of the rail member 15. A biasing force of the spring plunger 31 is adjustable by changing an amount of threaded engagement of the spring plunger 31 with the mounting member 30.

Similarly (referring to FIG. 3), a pair of quadrangular prismatic rail members 40 are fixed at opposite ends on the upper surface of the X stage 14 in such a manner as to extend in parallel relationship to each other and perpendicular relationship to the rail members 15 on the fixed plate 11. Each of the rail members 40 is formed on its inside surface with a straight groove 41 having a substantially V-shaped configuration in cross section. A rectangular Y stage (a moving plate) 42 is provided over the X stage 14 in the same manner as previously mentioned. That is, a pair of quadrangular prismatic rail members 44 each having a sectionally V-shaped straight groove 43 are fixed on the lower surface of the Y stage 42, and a plurality of ball bearings 17A are interposed between the groove 43 of each rail member 40 and the groove 43 of the mating rail member 44, thereby making the Y stage 42 reciprocatively movable along the rail members 40 of the X stage 14. In this case, the X stage 14 functions as a fixed plate for the Y stage 42.

A mounting member 30A for mounting an ultrasonic linear motor 20A including a body portion and a pair of leg portions of the same construction as mentioned above is fixed on the upper surface of the X stage 14, and a spring plunger 31A is threadedly engaged with the mounting member 30A so as to bias the body portion at its central position and thereby press the free ends of the leg portions against the inside surface of one of the rail members 44.

A rectangular fixed table 52 having a central circular hole 51 is fixed on the upper surface of the Y stage 42. The circumferential surface of the fixed table 52 formed by the central circular hole 51 is formed with an annular groove 53 having a substantially V-shaped configuration in cross section. A disk-like rotating table 54 is provided over the fixed table 52 in the following manner. That is, a ring-like member 55 is fixed on the lower surface of the rotating table 54 in such a manner that the outside circumferential surface of the ring-like member 55 is opposed to the inside circumferential surface of the fixed table 52 formed by the central circular hole 51. The outside circumferential surface of the ring-like member 55 is formed with an annular groove 56 having a substantially V-shaped configuration in cross section. A plurality of ball bearings 17B are interposed between the annular groove 56 of the ring-like member 55 and the annular groove 53 of the fixed table 52, so that the rotating table 54 may be rotated about its axis through the ball bearings 17B with respect to the fixed table 52.

A mounting member 30B for mounting an ultrasonic motor 60 having a body portion 63 and a pair of leg portions 61 and 62 is fixed on the upper surface of the Y stage 42, and a spring plunger 31B is threadedly engaged with the mounting member 30B so as to bias the body portion 63 at its central position and thereby press the free ends of the leg portions 61 and 62 against the inside surface of the ring-like member 55 of the rotating table 54.

Figure 4:
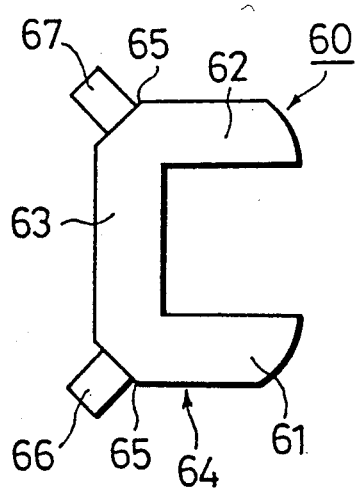
FIG. 4 is a plan view of an ultrasonic motor shown in FIG. 3.

As shown in FIG. 4, the ultrasonic motor 60 is composed of a vibrating member 64 formed of an elastic material and a pair of piezoelectric elements 66 and 67 for applying vibration to the vibrating member 64. The vibrating member 64 is composed of the body portion 63 and the parallel leg portions 61 and 62 integrally connected at their base ends to the opposite ends of the body portion 63 in such a manner as to form a generally U-shaped configuration in plan. The leg portions 61 and 62 and the body portion 63 have a substantially square cross section. A pair of corners of the U-shaped vibrating member 64 are chamfered to form a pair of mount surfaces 65 for mounting the pair of piezoelectric elements 66 and 67 such as a stacked piezoelectric actuator adapted to be expanded and contracted in the directions perpendicular to the mount surfaces 65. The free ends of the leg portions 61 and 62 are formed into curved surfaces to be fitted with the inside surface of the ring-like member 55.

In the X-Y stage as constructed above, the X stage 14 is moved by the ultrasonic linear motor 20 in the following manner. Assuming that the voltage to be applied to the first piezoelectric element 26 is represented by $V_a = E \cdot \sin\omega t$, the voltage to be applied to the second piezoelectric element 27 is represented by $V_b = E \cdot \sin(\omega t - \pi/2)$. As a result, the vibration to be applied to the leg portions 21 and 22 by the piezoelectric elements 26 and 27 is represented as follows:

The vibration to the first leg portion 21 is:

$$X_1 = A \cdot \sin(\omega t + \pi/2)$$

$$Y_1 = B \cdot \sin(\omega t + \pi)$$

The vibration to the second leg portion 22 is:

$$X_2 = A \cdot \sin\omega t$$

$$Y_2 = B \cdot \sin(\omega t + \pi/2)$$

Accordingly, the free ends of the leg portions 21 and 22 are elliptically vibrated. Further, as the vibration of the first leg portion 21 is different in phase by 90 degrees from the vibration of the second leg portion 22, the free ends of the leg portions 21 and 22 are alternately pressed against the rail member 15 of the X stage 14 in one direction. As a result, the X stage 14 is moved in one direction along the rail members 12 of the fixed plate 11.

The direction of the movement of the X stage 14 can be changed by changing the voltage to be applied to the second piezoelectric element 27 to $V_b = E \cdot \sin(\omega t + \pi/2)$.

Similarly, the Y stage 42 can be moved by the ultrasonic linear motor 20A along the rail members 40 of the X stage 14.

Further, when the voltage is applied to the piezoelectric elements 66 and 67 of the ultrasonic motor 60 in the same manner as the above, the free ends of the leg portions 61 and 62 are alternately pressed against the inside surface of the ring-like member 55 of the rotating table 54 in one direction. Accordingly, the ring-like member 55 is rotated in one direction about its axis with respect to the Y stage 42.

The X-Y stage as mentioned above has the following advantages. First, since the X stage 14 is driven by a frictional force between the free ends of the leg portions 21 and 22 of the ultrasonic linear motor 20 and the rail member 15 of the X stage 14, the X stage 14 may be moved at a high speed, and it may be positioned with a high accuracy. Similarly, the same advantage may be obtained for the Y stage 42 by the ultrasonic linear motor 20A. Further, since the rotating table 54 is driven by the ultrasonic motor 60, it may be rotated at a high speed, and it may be positioned with a high accuracy.

The X stage 14, the Y stage 42 and the rotating table 54 are directly driven by the ultrasonic linear motors 20 and 20A and the ultrasonic motor 60, respectively, without using a transmitting mechanism such as a screw shaft. Further, these motors are located inside the X-Y stage. Therefore, the general construction or size of the X-Y stage may be made compact.

Further, as no screw shaft is used, the moving distances of the X stage 14 and the Y stage 42 may be increased.

Further, as no magnetic field is generated, the X-Y stage may be applied to equipment where a magnetic field.

Additionally, as the structure of the ultrasonic linear motors 20 and 20A and the ultrasonic motor 60 is simple as compared with the complex structure of a stepping motor including a coil and a magnet, the X-Y stage may be made compact and lightweight.

Although the ultrasonic linear motor 20 is fixed to the fixed plate 11 so as to move the X stage 14 in the above-mentioned preferred embodiment, the motor 20 may be fixed to the X stage 14 in such a manner that the free ends of the leg portions 21 and 22 are pressed against the fixed plate 11. In this case, the motor 20 is moved together with the X stage 14. For example, a rail member may be fixed on the fixed plate 11 along the rail member 15 of the X stage 14, and the ultrasonic linear motor 20 is fixed to the rail member 15. The free ends of the leg portions 21 and 22 of the motor 20 are pressed against the rail member of the fixed plate 11. When the motor 20 is driven, the free ends of the leg portions 21 and 22 of the motor 20 are alternately pressed against the fixed plate 11 in one direction. As a result, the motor 20 is moved in the counter direction by a reaction of the pressing force applied to the fixed plate 11, thereby moving the X stage 14.

Similarly, the ultrasonic linear motor 20A or the ultrasonic motor 60 may be fixed to the Y stage 42 or the rotating table 54, respectively.

Figure 5:
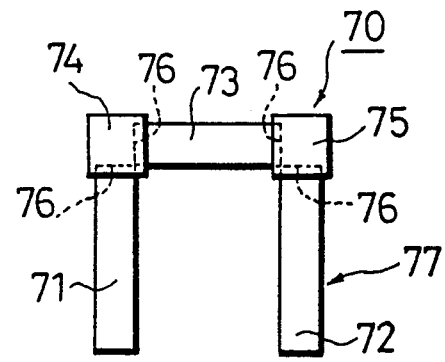
FIG. 5 is a plan view of another preferred embodiment of the ultrasonic linear motor according to the present invention.
Figure 6:
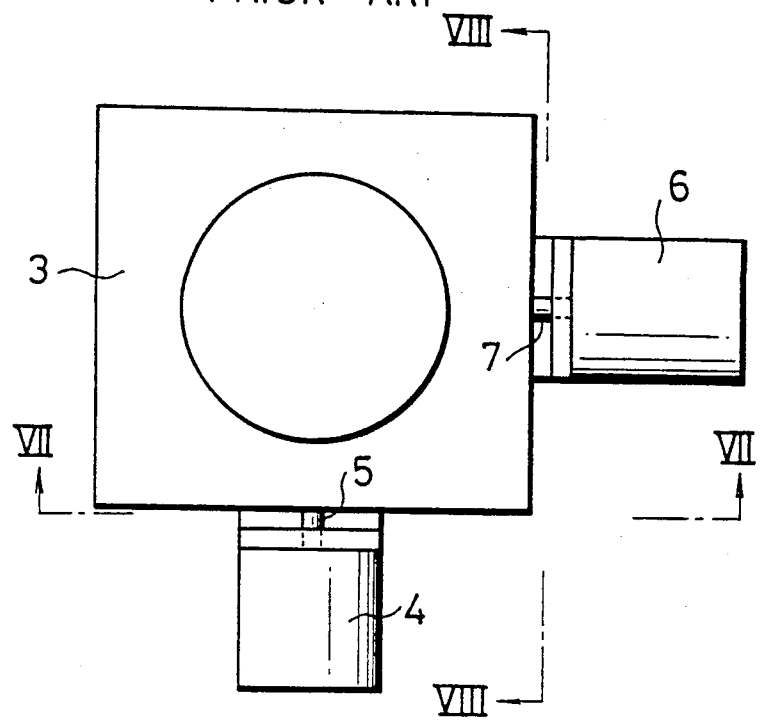
FIG. 6 is a plan view of the X-Y stage in the prior art.
Figure 7:
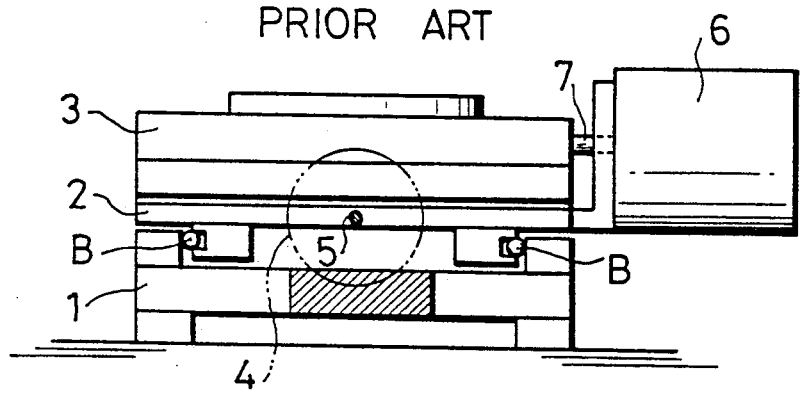
FIG. 7 is a cross section taken along the line VII—VII in FIG. 6.
Figure 8:
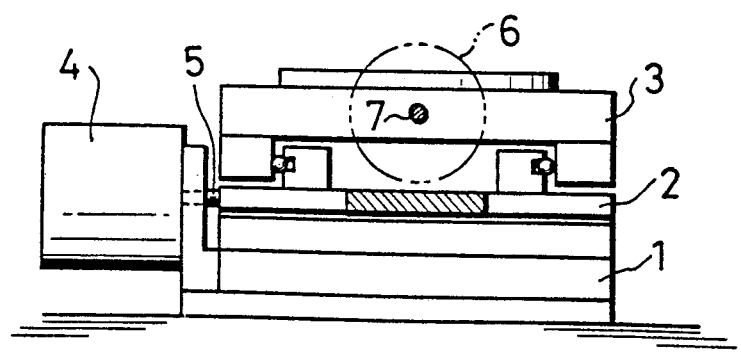
FIG. 8 is a cross section taken along the line VIII—VIII in FIG. 6.

Referring to FIG. 5 which shows another preferred embodiment of the ultrasonic linear motor, reference numeral 70 generally designates an ultrasonic linear motor constructed of a substantially U-shaped vibrating body 77. The vibrating body 77 is composed of a pair of leg portions 71 and 72, a body portion 73 and a pair of cubic connecting blocks 74 and 75 for connecting the leg portions 71 and 72 with the body portion 73. The leg portions 71 and 72 and the body portion 73 are formed from a prismatic stacked piezoelectric actuator having a square cross section, and they are adapted to be longitudinally expanded and contracted upon application of voltage from a high-frequency power supply. The cubic connecting blocks 74 and 75 are formed of iron, and are formed with recesses 76 for receiving the opposite ends of the body portion 73 and also receiving base ends of the leg portions 71 and 72. Thus, the body portion 73 and the leg portions 71 and 72 are fixedly connected to each other through the connecting blocks 74 and 75 by adhesive such as epoxy resin.

The voltage of $V_a = E_x \cdot \sin\omega t$ is applied to the body portion 73, and the voltage of $V_b = E_y \cdot \sin(\omega t + 3\pi/2)$ is applied to the first leg portion 71, and the voltage of $V_c = E_y \cdot \sin(\omega t + \pi/2)$ is applied to the second leg portion 72. As a result, the free ends of the leg portions 71 and 72 are elliptically vibrated. The vibration of the first leg portion 71 and the vibration of the second leg portion 72 are different in phase by 180 degrees as follows:

$$X_1 = -X_2; Y_1 = -Y_2$$

Accordingly, the ultrasonic linear motor 70 as constructed above can move the X stage 14 or the Y stage in one direction.

Further, the moving direction of the ultrasonic linear motor 70 may be reversed by changing the voltage to be applied to the body portion 73 into $V_a = E_x \cdot \sin(\omega t + \pi)$.

In the case that the ultrasonic linear motor 70 is utilized as an ultrasonic motor for driving the rotating table 54, the free ends of the leg portions 71 and 72 of the motor 70 are formed into curved surfaces to be fitted with the inner surface of the ring-like member 55 of the rotating table 54.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An X-Y stage comprising a fixed plate, a moving plate adapted to linearly reciprocatively move relative to said fixed plate, and an ultrasonic linear motor for driving said X-Y stage provided on one of said fixed plate and said moving plate, said ultrasonic linear motor comprising a vibrating member which comprises (i) two leg portions oriented in a direction perpendicular to the moving direction of said moving plate, each of said two leg portions having a base end and an oppositely extending free end, (ii) a body portion for connecting said base ends of said leg portions, and (iii) a pair of vibration sources for vibrating said leg portions and said body portion, said pair of vibration sources being mounted adjacent said base ends on said body portion, said free ends of said leg portions pressing against the other one of said fixed plate and said moving plate.

2. The X-Y stage as defined in claim 1, wherein said leg portions are a pair of parallel leg portions connected with said body portion forming a substantially U-shaped vibrating member formed of an elastic material, and said pair of vibration sources comprise a pair of piezoelectric elements, each one of said pair of piezoelectric elements being mounted on said vibrating member at a corner portion of said substantially U-shaped vibrating member opposite said free end of said leg portion.

* * * * *